United States Patent
Hwang et al.

(10) Patent No.: US 10,242,463 B2
(45) Date of Patent: *Mar. 26, 2019

(54) PROVIDING VISUALIZATION DATA TO A CO-LOCATED PLURALITY OF MOBILE DEVICES

(71) Applicant: International Business Machines Corporation, Armonk, NY (US)

(72) Inventors: Inseok Hwang, Austin, TX (US);
Myung-Chul Kim, Austin, TX (US);
Gelareh Taban, Austin, TX (US);
Chungkuk Yoo, Yuseong-gu (KR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/795,140

(22) Filed: Oct. 26, 2017

(65) Prior Publication Data

US 2018/0075624 A1 Mar. 15, 2018

Related U.S. Application Data

(63) Continuation of application No. 15/261,809, filed on Sep. 9, 2016.

(51) Int. Cl.
*G09G 5/00* (2006.01)
*G06T 11/00* (2006.01)
(Continued)

(52) U.S. Cl.
CPC .......... *G06T 11/00* (2013.01); *G06F 1/1626* (2013.01); *G06F 1/1694* (2013.01); *H04W 4/023* (2013.01); *G06F 2200/1614* (2013.01)

(58) Field of Classification Search
None
See application file for complete search history.

(56) References Cited

U.S. PATENT DOCUMENTS 8,909,299 B2 * 12/2014 Mercuri ............... H04M 3/42
345/1.1
8,909,899 B2 12/2014 Greiner et al.
(Continued)

FOREIGN PATENT DOCUMENTS

EP 2387019 A1 11/2011
HK 1184634 A2 10/2014

OTHER PUBLICATIONS

Schwarz et al., "Phone as a Pixel: Enabling Ad-Hoc, Large-Scale Displays Using Mobile Devices," SIGHI Conferences, 2012, p. 2235-2238.*

(Continued)

*Primary Examiner* — David H Chu
(74) *Attorney, Agent, or Firm* — Zilka-Kotab, P.C.

(57) ABSTRACT

A computer-implemented method according to one embodiment includes identifying, utilizing a hardware camera of a mobile device, vision code data from a plurality of additional devices, identifying an orientation of the mobile device, utilizing one or more sensors of the mobile device, calculating local observations utilizing the vision code data and the orientation, sending the local observations to a cloud-side service, receiving a timed tile sequence from the cloud-side service, in response to the sending of the local observations, and outputting the timed tile sequence, utilizing a display of the mobile device.

10 Claims, 12 Drawing Sheets

(51) Int. Cl.
*H04W 4/02* (2018.01)
*G06F 1/16* (2006.01)

(56) References Cited

U.S. PATENT DOCUMENTS

| | | | | |
|---|---|---|---|---|
| 9,128,897 | B1* | 9/2015 | Vucurevich | G06Q 10/101 |
| 9,271,137 | B2* | 2/2016 | Chan | H04W 8/02 |
| 2005/0170318 | A1 | 8/2005 | Yeomans | |
| 2011/0263342 | A1* | 10/2011 | Baldwin | G09B 1/40 |
| | | | | 472/57 |
| 2012/0026075 | A1 | 2/2012 | Yu et al. | |
| 2012/0060101 | A1* | 3/2012 | Vonog | H04N 21/4788 |
| | | | | 715/751 |
| 2012/0062758 | A1 | 3/2012 | Devine et al. | |
| 2012/0302256 | A1 | 11/2012 | Pai et al. | |
| 2014/0237043 | A1* | 8/2014 | Walsh | H04L 65/403 |
| | | | | 709/204 |
| 2015/0229894 | A1 | 8/2015 | Dietz | |
| 2016/0021153 | A1 | 1/2016 | Hull et al. | |
| 2017/0201740 | A1* | 7/2017 | Gordon | G06T 19/006 |
| 2018/0075623 | A1 | 3/2018 | Hwang et al. | |
| 2018/0077548 | A1 | 3/2018 | Hwang et al. | |
| 2018/0367966 | A1 | 12/2018 | Hwang et al. | |

OTHER PUBLICATIONS

Schwarz et al., "Phone as a Pixel: Enabling Ad-Hoc, Large-Scale Displays Using Mobile Devices," Proceedings of the SIGCHI Conference on Human Factors in Computing Systems, 2012, pp. 2235-2238.
Ludvigsen et al., "Designing Technology for Active Spectator Experiences at Sporting Events," Proceedings of the 22nd Conference of the Computer-Human Interaction Special Interest Group of Australia on Computer-Human Interaction, 2010, pp. 96-103.
NIST Cloud Computing Program, Retrieved From http://www.nist.gov/itl/cloud/on Dec. 9, 2013.
Mell et al., "Definition of Cloud Computing," National Institute of Standards and Technology, Information Technology Laboratory, Version 15, 2009, pp. 2.
Mell et al., "Definition of Cloud Computing," NIST Special Publication 800-145, 2001, pp. 1-7.
He et al., "Range-Free Localization Schemes for Large Scale Sensor Networks," MobiCom, 2003, pp. 1-15.
Zhong et al., "Achieving Range-free Localization Beyond Connectivity," SenSys, 2009, pp. 281-294.
Jun et al. "Social-Loc: Improving Indoor Localization with Social Sensing," SenSys, 2013, pp. 1-14.
Constandache et al., "Did You See Bob?: Human Localization using Mobile Phones," MobiCom, 2010, pp. 1-12.
Stoleru et al., "A High-Accuracy, Low-Cost Localization System for Wireless Sensor Networks," SenSys, 2005, pp. 1-14.
Stoleru et al., "StarDust: A Flexible Architecture for Passive Localization in Wireless Sensor Networks," SenSys, 2006, pp. 1-14.
Zhong et al., "MSP: Multi-Sequence Positioning of Wireless Sensor Nodes," SenSys, 2007, pp. 1-14.
Github, "Blinkenedroid Project," Retrieved from WayBackMachine, https://github.com/blinkendroid/blinkendroid, dated Feb. 2016, 2 pages.
Schmitz et al., "Ad-Hoc Multi-Displays for Mobile Interactive Applications," Eurographics, vol. 29, No. 2, 2010, pp. 1-8.
Merrill et al., "Siftables: Towards Sensor Network User Interfaces," MIT Media Laboratory, 2007, pp. 1-4.
"Atan2(3) Linux man page," Retrived from WayBack Machine, http://linux.die.net/man/3/atan2, dated Jan. 2016, 2 pages.
Hattachi et al., "A Deliverable by the NGMN Alliance, NGMN 5G White Paper" Feb. 17, 2015, pp. 1-125.
Banerjee et al., "Virtual Compass: Relative Positioning to Sense Mobile Social Interactions," Proceedings of the 8th International Conference on Pervasive Computing, 2010, pp. 1-19.

Zhou et al., "Use It Free: Instantly Knowing Your Phone Attitude," Proceedings of MobiCom '14, ACM, Sep. 2014, pp. 1-12.
Zhu et al., "Demystifying 60GHz Outdoor Picocells," Proceedings of MobiCom '14, ACM, Sep. 2014, pp. 1-12.
Wang et al., "InFrame++: Achieve Simultaneous Screen-Human Viewing and Hidden Screen-Camera Communication," MobiSys '15, ACM, 2015, pp. 1-15.
Zhang et al., "SwordFight: Enabling a New Class of Phone-to-Phone Action Games on Commodity Phones," Proceedings of MobiSys '12, ACM, Jun. 25-29, 2012, pp. 1-14.
Waltz et al., "An Interior Algorithm for Nonlinear Optimization That Combines Line Search and Trust Region Steps," Department of Electrical and Computer Engineering, Northwestern University, Sep. 8, 2004, pp. 1-20.
Varol et al., "Evolution of Online User Behavior During a Social Upheaval," WebSci '14, Jun. 23-26, 2014, pp. 1-10.
Shi et al., "Reading between Lines: High-rate, Non-intrusive Visual Codes within Regular Videos via ImplicitCode," UbiComp '15, Sep. 7-11, 2015, pp. 157-168.
Byrd et al., "An Interior Point Algorithm for Large Scale Nonlinear Programming," Computer Science Dept., University of Colorado, Jul. 27, 1997, 1-27.
Choudhary et al., "Social Media Evolution of the Egyptian Revolution," Communications of the ACM, vol. 55, No. 5, 2012, pp. 74-80.
Piven et al., "Poor People's Movements: Why They Succeed, How They Fail," Vintage Books Edition, Jan. 1979, pp. 1-402.
Peng et al., "BeepBeep: A High Accuracy Acoustic Ranging System using COTS Mobile Devices," SenSys '07, Nov. 6-9, 2007, pp. 1-14.
O'Hara et al., "Understanding Collective Play in an Urban Screen Game," Research Gate, CSCW '08, Nov. 2008, pp. 1-10.
Li et al., "Real-Time Screen-Camera Communication Behind Any Scene," MobiSys '15, May 18-22, 2015, pp. 1-15.
Olguin et al., "Sensible Organizations: Technology and Methodology for Automatically Measuring Organizational Behavior," IEEE transactions on Systems, Man, and Cybernetics—Part B, vol. 39, No. 1, Feb. 2009, pp. 43-55.
Lamarca et al., "Place Lab: Device Positioning Using Radio Beacons in the Wild," Intel Research, Oct. 2004, pp. 1-20.
Kuznetsov et al., "Red Balloon, Green Balloon, Sensors in the Sky," UbiComp '11, Sep. 17-21, 2011, pp. 1-10.
Jang et al., "RubberBand: Augmenting Teacher's Awareness of Spatially Isolated Children on Kindergarten Field Trips," UbiComp '12, Sep. 5-8, 2012, pp. 1-4.
Jacobs, H., "To count a crowd," California Journalism Conference in Sacramento, Spring 1967, p. 37.
Hernandez et al., "Mood Meter: Counting Smiles in the Wild," UbiComp '12, Sep. 5-8, 2012, pp. 301-310.
Hazas et al., "A Relative Positioning System for Co-located Mobile Devices," MobiSys '05: The Third International Conference on Mobile Systems, Applications, and Services, 2005, pp. 177-190.
Gonzalez-Bailon et al., "The Dynamics of Protest Recruitment; through an Online Network," Scientific Reports, No. 1 : 197, Dec. 15, 2011, pp. 1-7.
Friday et al., "Reflections on Long-Term Experiments with Public Displays," Computer, Published by the IEEE Computer Society, May 2012, pp. 34-41.
Fiala, M., "ARTag, a fiducial marker system using digital techniques," 2005 IEEE Computer Society Conference on Computer Vision and Pattern Recognition (CVPR'05), Jun. 20, 2005, 7 pages.
Hwang et al., U.S. Appl. No. 15/261,792, filed Sep. 9, 2016.
Hwang et al., U.S. Appl. No. 15/261,809, filed Sep. 9, 2016.
Zandbergen, P. "Accuracy of iPhone Locations: A Comparison of Assisted GPS, WiFi and Cellular Positioning," Transactions in GIS, vol. 13, No. 1, 2009, pp. 5-26.
Symington et al., "Encounter Based Sensor Tracking," MobiHoc '12, Jun. 11-14, 2012, pp. 15-24.
Okatani et al., "Easy Calibration of a Multi-projector Display System," International Journal of Computer Vision, vol. 85, Apr. 28, 2009, pp. 1-18.
Barker et al., "Investigating Political and Demographic Factors in Crowd Based Interfaces," ACM, 2009, pp. 413-416.

(56) References Cited

OTHER PUBLICATIONS

Almasi et al., "MaJIC: Compiling MATLAB for Speed and Responsiveness," PLDI '02, Jun. 17-19, 2002, pp. 294-303.
Barkhuus et al., "Engaging the Crowd—Studies of Audience-Performer Interaction," CHI 2008, Apr. 5-10, 2008, pp. 2925-2930.
Brown et al., "Crowd Computer Interaction," CHI 2009, Apr. 4-9, 2009, pp. 4755-4758.
Clinch et al., "Mercury: An Application Store for Open Display Networks," UBICOMP '14, Sep. 13-17, 2014, pp. 511-522.
Davies et al., "Open Display Networks: Towards a New Communications Medium for the 21st Century," IEEE Computer, 2012, pp. 1-7.
Gehring et al., "Facade Map—Continuous Interaction with Media Facades Using Cartographic Map Projections," UbiComp 12, Sep. 5-8, 2012, pp. 471-480.
Luo et al., "SocialWeaver: Collaborative Inference of Human Conversation Networks Using Smartphones," SenSys 13, Nov. 11-15, 2013, pp. 1-14.
McCafferty, D., "Activism Vs. Slacktivism," Communications of the ACM, vol. 54, No. 12, Dec. 2011, pp. 17-19.
Meyer, D., "Protest and Political Opportunities," Annual Review of Sociology, vol. 30, 2004, pp. 125-145.
Miyaoku et al., "C-Blink: A Hue-Difference-Based Light Signal Marker for Large Screen Interaction via Any Mobile Terminal," UIST '04, vol. 6, No. 2, Oct. 24-27, 2004, pp. 147-156.
Rekimoto, J., "Squama: A Programmable Window and Wall for Future Physical Architectures," UbiComp '12, Sep. 5-8, 2012, pp. 667-668.
Valenzuela, S., "Unpacking the Use of Social Media for Protest Behavior: The Roles of Information, Opinion Expression, and Activism," American Behavioral Scientist, Developed/Developing Countries, 2013, pp. 920-942.
Jurgensen, J., "Concert Crowds Flounder in Digital Dead Zones," The Wall Street Journal, Dec. 4, 2014, pp. 1-9.
"Holograms for Freedom," website http://www.hologramasporlalibertad.org/en.html, accessed Mar. 21, 2016, 2 pages.
Kivett Productions, "Card Stunts," website http://www.cardstunts.com, accessed Mar. 26, 2016, 3 pages.
Chen et al., "Enhanced Location Estimation with the Virtual Base Stations in Wireless Location Systems," IEEE Vehicular Technology Conference, 2006, pp. 603-607.
Non-Final Office Action from U.S. Appl. No. 15/261,792, dated May 19, 2017.
List of IBM Patents or Patent Applications Treated As Related.
Non-Final Office Action from U.S. Appl. No. 15/261,792, dated Dec. 15, 2017.
Final Office Action from U.S. Appl. No. 15/261,792, dated Jul. 13, 2018.
Final Office Action from U.S. Appl. No. 15/261,809, dated Aug. 3, 2018.
Non-Final Office Action from U.S. Appl. No. 15/261,809, dated Jan. 26, 2018.
Hwang et al., U.S. Appl. No. 16/111,119, filed Aug. 23, 2018.
Non-Final Office Action from U.S. Appl. No. 16/111,119, dated Oct. 5, 2018.
Advisory Action from U.S. Appl. No. 15/261,792, dated Oct. 4, 2018.
Notice of Allowance from U.S. Appl. No. 15/261,809, dated Oct. 29, 2018.
Corrected Notice of Allowance from U.S. Appl. No. 15/261,809, dated Jan. 9, 2019.

\* cited by examiner

US 10,242,463 B2

PROVIDING VISUALIZATION DATA TO A CO-LOCATED PLURALITY OF MOBILE DEVICES

BACKGROUND

The present invention relates to data display, and more specifically, this invention relates to analyzing a plurality of mobile devices and providing visualization data to the plurality of mobile devices, based on the analysis.

Card stunts (e.g., the coordinated raising of cards by a group of individuals in order to create an image or text) are a popular and effective means of expression. However, current implementations of card stunts are time and resource intensive. For example, many card stunts take months to plan, and may require rehearsals and costly infrastructure.

SUMMARY

A computer-implemented method according to one embodiment includes identifying, utilizing a hardware camera of a mobile device, vision code data from a plurality of additional devices, identifying an orientation of the mobile device, utilizing one or more sensors of the mobile device, calculating local observations utilizing the vision code data and the orientation, sending the local observations to a cloud-side service, receiving a timed tile sequence from the cloud-side service, in response to the sending of the local observations, and outputting the timed tile sequence, utilizing a display of the mobile device.

Other aspects and embodiments of the present invention will become apparent from the following detailed description, which, when taken in conjunction with the drawings, illustrate by way of example the principles of the invention.

DETAILED DESCRIPTION

Figure 1:
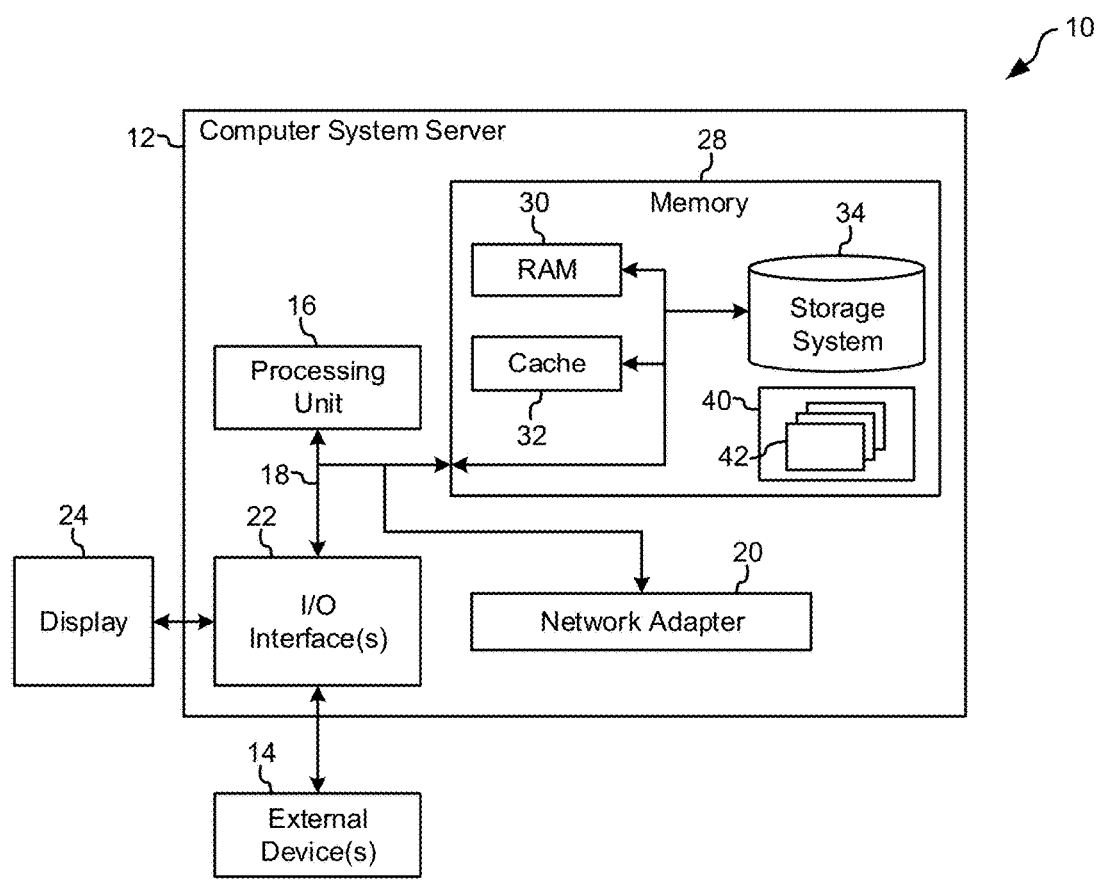
FIG. 1 depicts a cloud computing node according to an embodiment of the present invention.

The following description discloses several preferred embodiments of systems, methods and computer program products for providing visualization data to a co-located plurality of mobile devices. Various embodiments provide a method to determine a relative location of each of a plurality of mobile devices, based on observed data, and determine and deploy visualization data to each of the plurality of mobile devices, based on the relative location, such that the visualization data, when displayed by the screens of each of the plurality of mobile devices, creates a composite image (e.g., akin to a card stunt) when the screens of the plurality of mobile devices are viewed by an observer located remotely from the mobile devices at a distance where the observer is able to see the plurality of screens.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for providing visualization data to a co-located plurality of mobile devices.

In one general embodiment, a computer-implemented method includes identifying, utilizing a hardware camera of a mobile device, vision code data from a plurality of additional devices, identifying an orientation of the mobile device, utilizing one or more sensors of the mobile device, calculating local observations utilizing the vision code data and the orientation, sending the local observations to a cloud-side service, receiving a timed tile sequence from the cloud-side service, in response to the sending of the local observations, and outputting the timed tile sequence, utilizing a display of the mobile device.

In another general embodiment, a computer program product for implementing visualization data at a mobile device comprises a computer readable storage medium having program instructions embodied therewith, wherein the computer readable storage medium is not a transitory signal per se, and where the program instructions are executable by a processor to cause the processor to perform a method comprising identifying, utilizing the processor and a hardware camera of the mobile device, vision code data from a plurality of additional devices, identifying an orientation of the mobile device, utilizing the processor and one or more sensors of the mobile device, calculating local observations utilizing the processor, the vision code data, and the orientation, sending the local observations to a cloud-side service, utilizing the processor, receiving, utilizing the processor, timed tile sequences from the cloud-side service, in response to the sending of the local observations, and outputting the timed tile sequences, utilizing the processor and a display of the mobile device.

In another general embodiment, a system includes a processor and logic integrated with the processor, executable by the processor, or integrated with and executable by the processor, the logic being configured to identify, utilizing a hardware camera of a mobile device, vision code data from a plurality of additional devices, identify an orientation of the mobile device, utilizing one or more sensors of the mobile device, calculate local observations utilizing the vision code data and the orientation, send the local observations to a cloud-side service, receive timed tile sequences from the cloud-side service, in response to the sending of the local observations, and output the timed tile sequences, utilizing a display of the mobile device.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
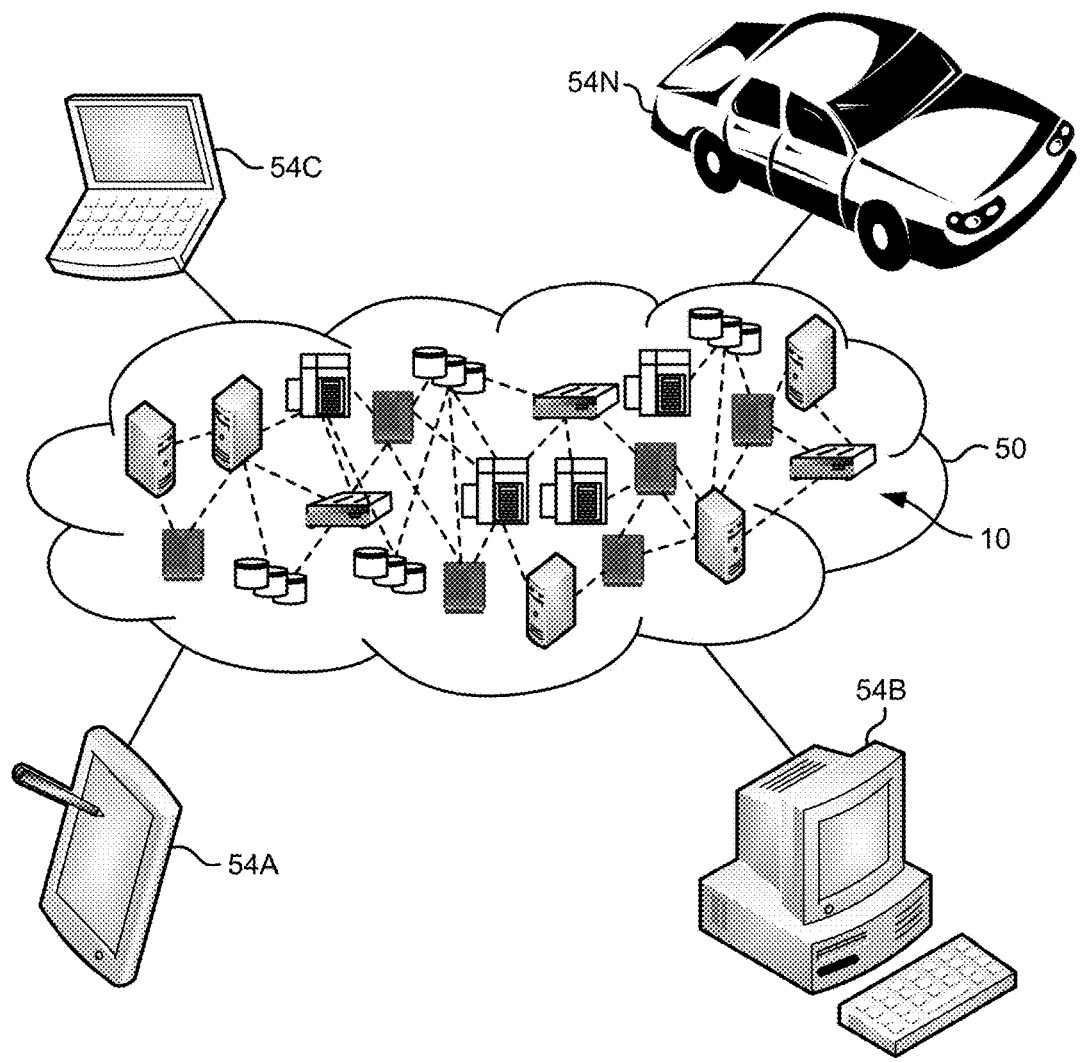
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
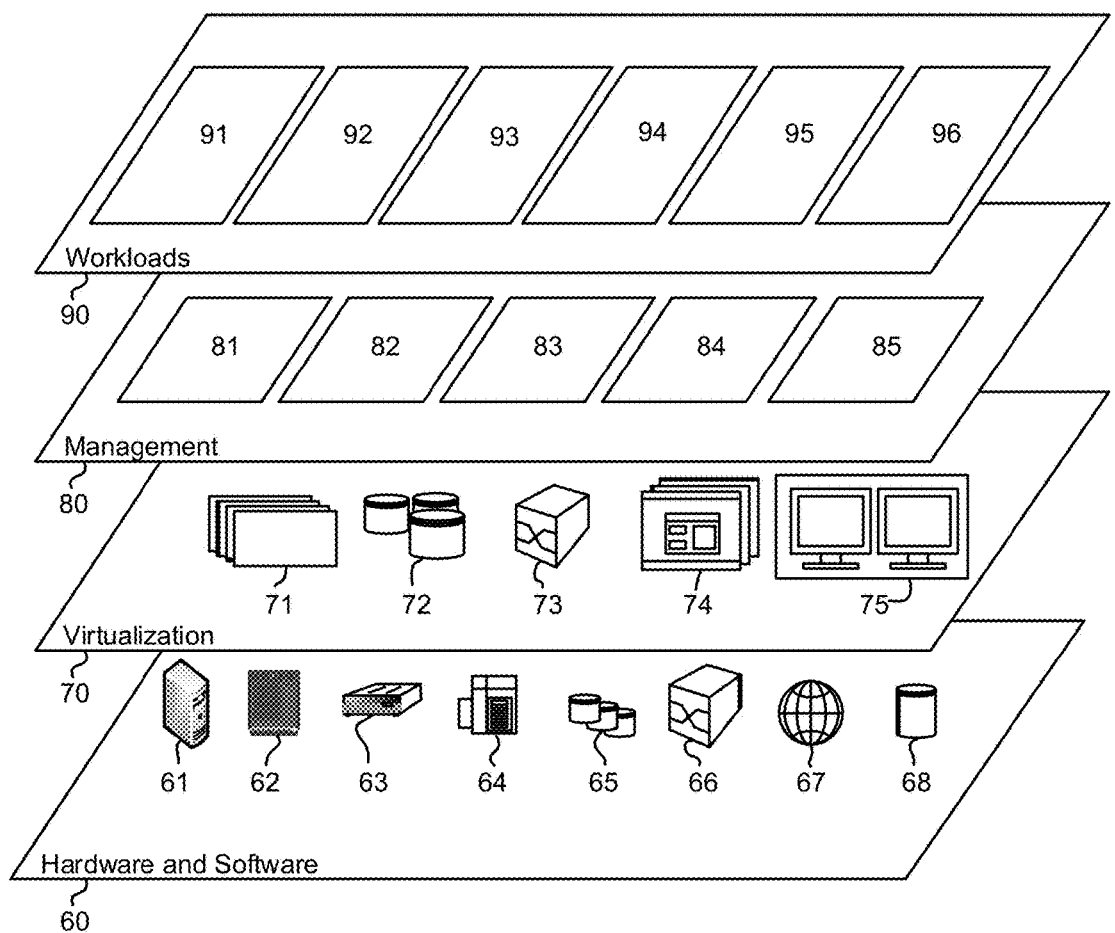
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and card stunt as a service (CaaS) 96.

Figure 4:
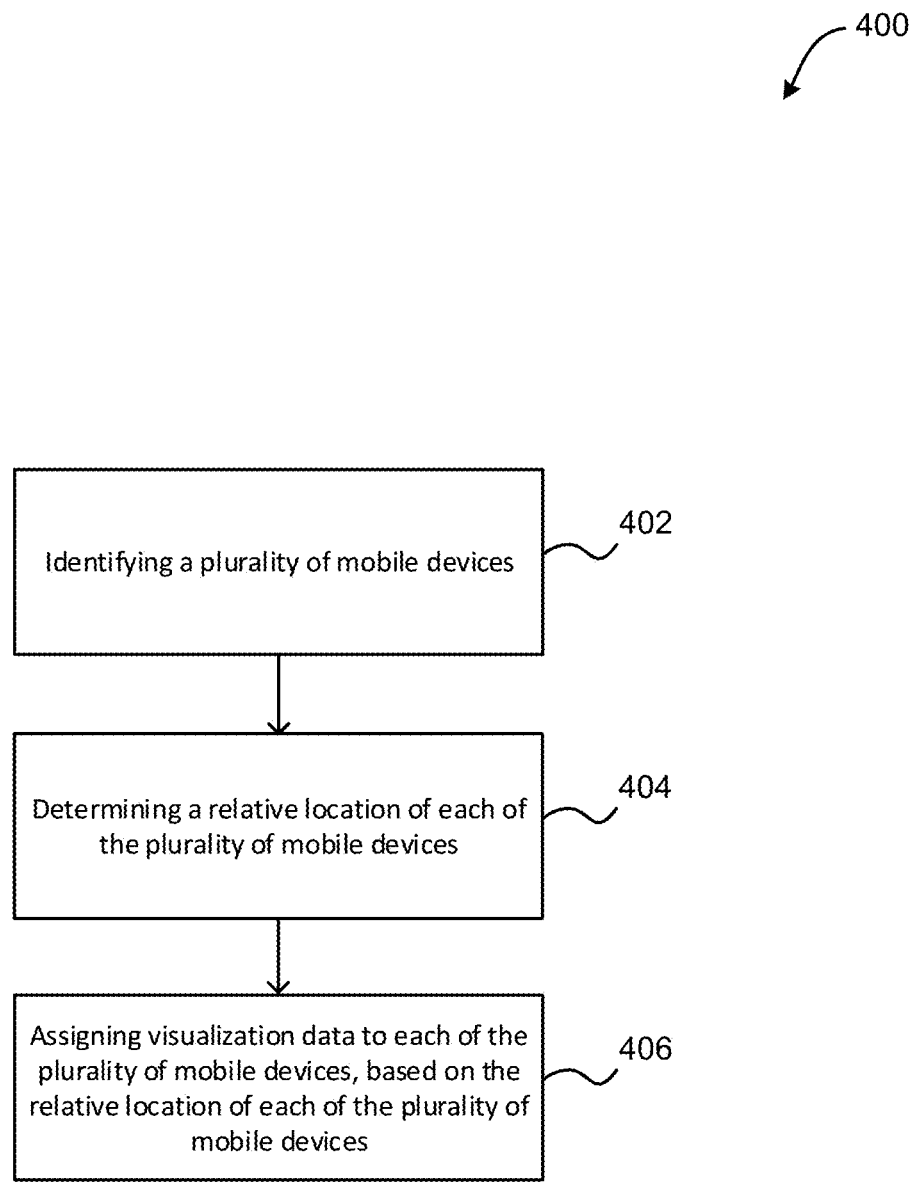
FIG. 4 illustrates a method for providing visualization data to a co-located plurality of mobile devices, in accordance with one embodiment.

Now referring to FIG. 4, a flowchart of a method 400 is shown according to one embodiment. The method 400 may be performed in accordance with the present invention in any of the environments depicted in FIGS. 1-3 and 5-7, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a plurality of mobile devices are identified. In one embodiment, the plurality of mobile devices may be located within a group of individuals. For example, each of the plurality of devices may be in the possession of a unique individual located within a single crowd of people, such that the plurality of devices are distributed throughout the group. In another embodiment, each of the plurality of mobile devices may include a mobile computing device such as a cell phone, a laptop computer, a portable music player, etc.

Additionally, as shown in FIG. 4, method 400 may proceed with operation 404, where a relative location of each of the plurality of mobile devices is determined. In one embodiment, determining the relative location of each of the plurality of mobile devices may include determining, for each of the plurality of mobile devices, a location of the mobile device with respect to the other devices of the plurality of mobile devices. In one embodiment, determining the relative location of each of the plurality of mobile devices may include performing relative localization on each of the plurality of mobile devices in order to determine a co-located group of the mobile devices.

Further, in one embodiment, determining the relative location of each of the plurality of mobile devices may be performed utilizing mobile vision sensing. In another embodiment, pair-wise visual observations may be performed at each of the plurality of mobile devices (e.g., utilizing an application installed on each of the mobile devices, etc.) in order to implement a vision-based device identification technique. For example, for each of the plurality of mobile devices, a unique identifier for the mobile device may be encoded utilizing a color-transition sequence, and such unique identifier may be displayed as a vision code on a display of the mobile device.

Further still, in another embodiment, for each of the plurality of mobile devices, the mobile device may identify other mobile devices of the plurality of mobile devices that are within a field of view of the mobile device (e.g., utilizing one or more cameras of the device and the vision codes of each of the plurality of mobile devices, etc.). For example, for each of the plurality of mobile devices, the mobile device may instruct a user of the mobile device to hold the mobile device above their head and/or shoulders.

In another example, after a predetermined time or once the mobile device determines that is being held above a user's head/shoulders, the mobile device may visually identify other mobile devices within the plurality of mobile devices. In yet another example, one or more of tactile and audio feedback may be provided to users of each of the plurality of mobile devices (e.g., in order to guide them to hold their phones in a desired orientation, etc.). In this way, distributed observations of the plurality of mobile devices may be obtained.

Also, in one embodiment, for each of the plurality of mobile devices, imprecise observations/orientations of the mobile device may be corrected during mobile vision sensing. For example, an orientation of a device may be normalized utilizing one or more of an API of the mobile device, a magnetometer of the mobile device, a gravity sensor of the mobile device, an accelerometer of the mobile device, etc. In another embodiment, for each of the plurality of mobile devices, compensation may be made for a displacement of a camera from a center of the mobile device during mobile vision sensing. In yet another embodiment, for each of the plurality of mobile devices, compensation may be made for an inaccurate measurement of a horizontal heading of the mobile device during mobile vision sensing.

In still another embodiment, for each of the plurality of mobile devices, an exposure of a camera and/or a brightness of a camera may be adjusted during mobile vision sensing, based on external lighting conditions. In another embodiment, a number of distinct colors included within the vision codes used during mobile vision sensing may be adjusted (e.g., to maximize bits-per-symbol, etc.), based on external lighting conditions. In yet another embodiment, determining the relative location of each of the plurality of mobile devices may include sending results of mobile vision sensing from the plurality of mobile devices to a cloud computing environment.

In addition, in one embodiment, determining the relative location of each of the plurality of mobile devices may be performed utilizing constrained optimization. For example, constrained nonlinear optimization may be performed within a cloud computing environment in order to reconstruct relative locations of each of the plurality of mobile devices, using distributed observations received from the plurality of mobile devices. In another example, the cloud computing environment may formulate a constrained optimization problem on the set of distributed observations. For instance, a linearly constrained nonlinear programming algorithm may be used to formulate and solve the constrained optimization problem.

Furthermore, in one embodiment, the constrained optimization may be accelerated. For example, acceleration may be performed by formulating a linearly constrained quadratic polynomial programming problem, and solving the problem within the cloud computing environment utilizing a quadratic programming algorithm to obtain an approximate solution. The approximate solution may then be sent to the linearly constrained nonlinear programming algorithm as initial values. In this way, the nonlinear programming algorithm may converge in a faster manner.

Further still, in one embodiment, the results of the constrained optimization may be used to reconstruct relative locations of each of the plurality of mobile devices with respect to each other (e.g., within a crowd of people, etc.), which may result in reconstructed locations for each of the plurality of mobile devices.

Also, as shown in FIG. 4, method 400 may proceed with operation 406, where visualization data is assigned to each of the plurality of mobile devices, based on the relative location of each of the plurality of mobile devices. In one embodiment, the visualization data may represent one or more of textual and graphical output.

Additionally, in one embodiment, the textual and/or graphical output may be pixelated into a matrix of tiles within the cloud computing environment. For example, the textual and/or graphical output may be resampled to fit a number of the plurality of mobile devices in both horizontal and vertical directions. In another example, reconstructed locations of each of the plurality of mobile devices may be quantized to snap to a virtual uniform grid, and unit grid spacing may be determined.

Further, in one embodiment, each tile within the matrix may be assigned to a mobile device at a location matching a respective location within the matrix. For example, each resampled image may be assigned to a mobile device having a quantized location at a corresponding grid location of a virtual uniform grid. In another embodiment, a single tile or a timed sequence of tiles may be sent to each of the plurality of devices at each location within the virtual uniform grid. In yet another embodiment, instead of or in addition to tiles, individual cues may be sent to a display of each of the plurality of mobile devices that instruct a user of each mobile device to manually display one or more cards.

Further still, in one embodiment, a global positioning system (GPS) module located within one or more of the plurality of mobile devices may be used to refine the determination of the relative location of each of the plurality of mobile devices when a number of the plurality of mobile devices exceeds a threshold (e.g., within large crowds, etc.). For example, the GPS module may provide estimated locations of each of the plurality of mobile devices, and additional constraints may be created when solving the constrained optimization problem. As a result, the constrained optimization problem may be solved with both the original constraints (e.g., from local pair-wise observations using vision codes, etc.) and the GPS-obtained locations.

In another embodiment, adjustments may be made during the determination of the relative location of each of the plurality of mobile devices to account for a height of a user of each of the plurality of mobile devices, as well as ground slope. In yet another embodiment, a divide and conquer strategy may be utilized during the determination of the relative location of each of the plurality of mobile devices when a number of the plurality of mobile devices exceeds a threshold.

Also, in one embodiment, instructions for display of visualization materials (e.g., cue cards or other colored or decorated cards, etc.) may be assigned to each of the plurality of mobile devices instead of visualization data, based on the relative location of each of the plurality of mobile devices.

In this way, a visualization of textual or graphical data may be achieved (e.g., similar to a card stunt, etc.) using a plurality of devices collectively. For example, a grouping of the screens of each of the plurality of mobile devices may create a composite image (e.g., akin to a card stunt) when the screens of the plurality of mobile devices are viewed by an observer located remotely from the mobile devices at a distance where the observer is able to see the plurality of screens. This may enable collective visualization without rehearsals, pre-planning, or stationary infrastructure.

Figure 5:
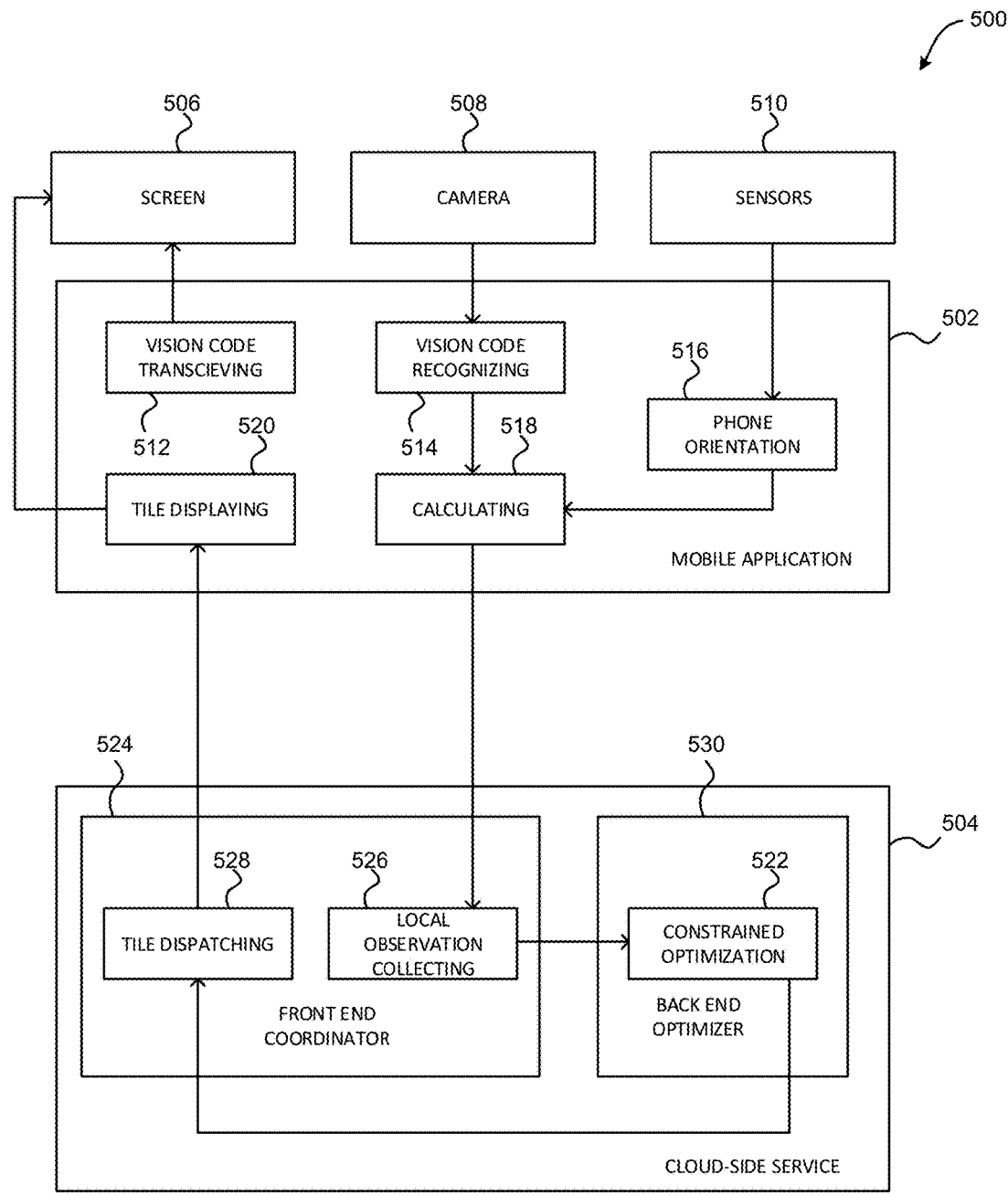
FIG. 5 illustrates an exemplary card stunt as a service (CaaS) architecture, in accordance with one embodiment.

Now referring to FIG. 5, an exemplary card stunt as a service (CaaS) architecture 500 is shown according to one embodiment. As shown, the CaaS architecture 500 includes a mobile application 502 and a cloud-side service 504. In one embodiment, the mobile application 502 may be installed on a mobile device. For example, each of a plurality of users located within a group may have an instance of the mobile application 502 installed on their mobile device. In another embodiment, the cloud-side service 504 may include a cloud computing environment in communication with the mobile application 502.

Additionally, the mobile application 502 is in communication with a screen 506, a camera 508, and sensors 510 of a mobile device. The mobile application 502 also includes a plurality of modules 512-520 for implementing CaaS on the mobile device side. The cloud-side service 504 includes a back end optimizer 530 containing a constrained optimization module 522, and also includes a front end coordinator 524 that includes a local observation collecting module 526 and a tile dispatching module 528.

For example, in order to perform collective user localization, mobile vision sensing may be performed by the mobile application 502. In one embodiment, a vision code transceiving module 512 may determine a unique vision code for the mobile device and may output the vision code via the screen 506. In another embodiment, the vision code recognizing module 514 may identify other vision codes (e.g., vision codes from other mobile devices, etc.), utilizing the camera 508, and may measure a relative angle between the observing mobile device and the observed mobile device. In yet another embodiment, the phone orientation module 516 may determine an orientation of the mobile device, utilizing the sensors 510 of the mobile device.

In one embodiment, for the generation of the vision code, for real-time video processing on a mobile device, temporally coded single colored frames may be implemented and extended it to be more error resilient and real-time decodeable in mobile devices. For example, the vision code may include one or more of red, green, and blue frames. In one embodiment, green frames may be delimiters separating repeated transmissions, and blue and red frames may denote one and zero, respectively. Of course, however, any color may be assigned for any purpose. In another embodiment, the number of colors may be extensible depending on the external lighting conditions. Fixed-duration coding may be used for each bit; a blue or red frame lasting for a predefined time may represent a single '1' or '0' symbol, respectively.

In another embodiment, a vision code may include one or more of three parts: 1) delimiter; 2) encoded identifier of a mobile device; 3) delimiter. Each mobile device may obtain its unique binary identifier from the front end coordinator 524. For error resiliency, the identifier may be encoded utilizing Hamming code or other error detecting/correcting codes such as CRC or repetition codes.

Further, in one embodiment, each device may generate its own vision code and may observe others' codes at the same time. For every incoming video frame, each pixel may be ternary quantized based on its hue channel in HSV space—for example, into red if the pixel's hue value belongs to a range [300,360) or [0,60), into green if in [60,180), and into blue if in [180,300). Ternary quantization may achieve reliable decoding under various conditions.

To help a mobile device search for a valid vision code in real time, one pixel may be sampled out of every 2×2 (or larger) block, which may achieve real-time search operations (e.g., at 10-25 fps, etc.). The ternary quantized video frames may be buffered. When a delimiter pixel arrives, the temporal bit sequence at this pixel location until the previous delimiter may be examined; a valid code may be confirmed if the sequence length is equal to the code length and the decoder finds no error bit. The same vision codes may appear at multiple adjacent pixels at once; those pixels' centroid may be defined as that vision code's on-picture coordinates. Once a valid vision code and its on-picture coordinates are found, the observer may identify the target device, compute the angle $\theta_{ij}$ in Table 1, and send a tuple ($D_i$, $D_j$, $\theta_{ij}$) to the cloud-side service 504, where $D_i$ and $D_j$ are its own and the target's identifiers, respectively.

Further, in one embodiment, the other vision codes identified by the recognizing module 514 and the orientation of the mobile device determined by the phone orientation module 516 may be sent to a calculating module 518 within the mobile application 502 that may determine local observations (such as relative angles and orientations, etc.) utilizing such information.

Figure 9:
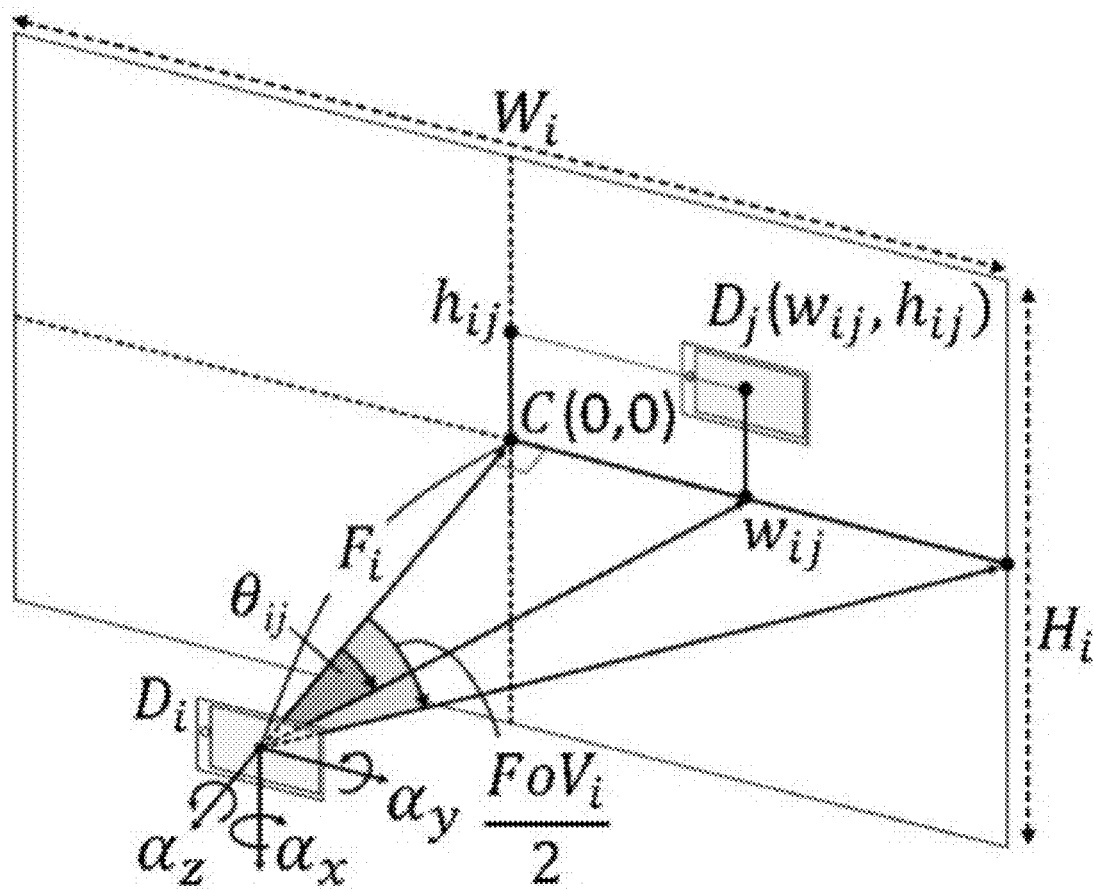
FIG. 9 illustrates an example of an observer mobile device and a screen of a target mobile device, in accordance with one embodiment.

For example, the mobile application 502 may observe horizontal angular distances to other devices seen from its camera 508. Consider FIG. 9, which provides an example of an observer mobile device $D_i$ and a screen of a target mobile device $D_j$. In one embodiment, given a camera of an observer device $D_i$ and a screen of a target device $D_j$, the horizontal angle $\theta_{ij}$ may be defined by two lines: one perpendicular to the image plane of $D_i$'s camera, and the horizontal projection of the line connecting $D_i$'s camera center and $D_j$'s screen center. In another embodiment, visual observation may allow for a calculation of $\theta_{ij}$, given $D_i$'s field of view $FoV_i$, the resolution of the picture seen from $D_i$'s camera ($W_i$, $H_i$), and the on-picture coordinates of $D_j$ seen from $D_i$'s camera ($w_{ij}$, $h_{ij}$). In yet another embodiment, an operating platform of the mobile device may provide $FoV_i$ as well $W_i$ and $H_i$ at runtime.

Table 1 illustrates an exemplary computation of $\theta_{ij}$. Of course, it should be noted that the computation shown in Table 1 is set forth for illustrative purposes only, and thus should not be construed as limiting in any manner.

TABLE 1 first compute the focal distance $F_i$ in pixels:

$$F_i = \frac{W_i}{2}\left(\tan\frac{FoV_i}{2}\right)^{-1}$$

Then $\theta_{ij}$ is given by: $\theta_{ij} = -\arctan 2\,(w_{ij}, F_i)$
where arctan2(y,x) is a two-variable extension of $\arctan \frac{y}{x}$, so that its range is defined over $(-\pi, \pi]$ In one embodiment, the leading negative sign in Table 1 may be added to keep $\theta_{ij}$'s sign consistent with the Cartesian coordinate system. This may illustrate one situation when $D_i$ is at a perfect landscape orientation and standing upright, i.e., $\alpha_y=0$, $\alpha_z=0$. In another embodiment, a device held in a user's hand may have nonzero orientation angles. In response, $\theta_{ij}$ may be calibrated by compensating the device's orientation.

Figure 10:
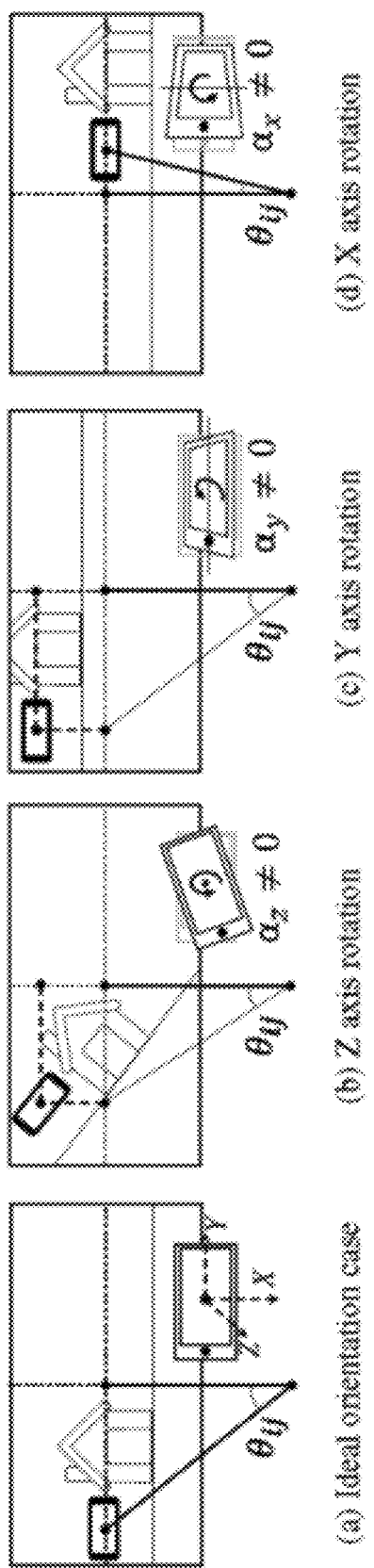
FIG. 10 illustrates exemplary incorrect measurements caused by camera orientations, in accordance with one embodiment.

FIG. 10 illustrates exemplary incorrect measurements of $\theta_{ij}$ caused by camera orientations. In one embodiment, to reorient $w_{ij}$ and evaluate the true $\theta_{ij}$, an X-Y-Z intrinsic rotation may be defined, where the element rotation angles $\alpha_x$, $\alpha_y$, and $\alpha_z$ may be obtained utilizing an application program interface (API) built into the mobile device, as well as sensors 510 of the mobile device, including a magnetometer of the mobile device and a gravity sensor of the mobile device. Each observing device may apply Z and Y rotation matrices $R_z$ and $R_y$ to the pre-rotation ($h_{ij}$, $w_{ij}$, $z_{ij}$), where is the point where a virtual sphere of the radius $F_i$ intersects with a line originating from ($h_{ij}$, $w_{ij}$) orthogonal to the camera's image plane.

Table 2 illustrates an exemplary computation of post-rotation coordinates ($h'_{ij}$, $w'_{ij}$, $z'_{ij}$). Of course, it should be noted that the computation shown in Table 2 is set forth for illustrative purposes only, and thus should not be construed as limiting in any manner.

TABLE 2

$[h'_{ij}\ w'_{ij}\ z'_{ij}]^T = R_y R_z [h_{ij}\ w_{ij}\ z_{ij}]^T$, where $$R_y = \begin{bmatrix} \cos\alpha_y & 0 & \sin\alpha_y \\ 0 & 1 & 0 \\ -\sin\alpha_y & 0 & \cos\alpha_y \end{bmatrix}, R_z = \begin{bmatrix} \cos\alpha_z & -\sin\alpha_z & 0 \\ \sin\alpha_z & \cos\alpha_z & 0 \\ 0 & 0 & 1 \end{bmatrix}$$

In one embodiment, the re-oriented $\theta'_{ij}$ may be computed using the computation in Table 1 and $w'_{ij}$. The mobile application 502 may send $\theta_{ij}$ to the front end coordinator 524. Note that x-rotation matrix $R_x$ may not be applied at local devices, because the back end optimizer may presume a global Cartesian plane whose negative x-axis is defined by the common heading of the crowd. To complete the x-rotation with respect to the back end coordinate system, the front end coordinator 524 may evaluate $\overline{\alpha_x}$, i.e., the average angle of all observing devices' $\alpha_x$. The final $\theta_{ij}$ may be obtained by $\theta'_{ij}+(\alpha_x-\overline{\alpha_x})$.

Further still, in one embodiment, in order to perform collective user localization, location reconstruction may be performed by the cloud-side service 504 utilizing constrained optimization sensing. In one embodiment, the local observation collecting module 526 may receive local observations from the calculating module 518, which may then be sent to the constrained optimization module 522 of the back end optimizer 530 to determine relative locations of each mobile device.

Also, in one embodiment, these relative locations may be sent from the constrained optimization module 522 to the tile dispatching module 528, which may send timed tiles to the use the relative locations to a tile displaying module 520 of the mobile application 502, which may then display the tiles via the screen 506 of the mobile device.

For example, as soon as the front end coordinator 524 retrieves all the observations from the mobile application 502, the back end optimizer 530 may start localization. The observations may include a set of ordered tuples ($D_i$, $D_j$, $\theta_{ij}$), meaning that an observer $D_i$ has visually identified a target $D_j$ at an angle of $\theta_{ij}$. Note that the observation may be unidirectional so this tuple does not necessarily imply the existence of a tuple ($D_j$, $D_i$, $\theta_{ij}$).

In a first case, every device may be heading toward an identical direction (i.e., identical $\alpha_x$ for all devices) and at perfect landscape orientations (i.e., $\alpha_y$=0, $\alpha_z$=0 for all devices). In the first case, a tuple ($D_i$, $D_j$, $\theta_{ij}$) may be represented on a Cartesian plane virtually overlaid over the ground. The coordinates of the two devices ($x_i$, $y_i$) and ($x_j$, $y_j$) as well as the distance between them may be unknown. All N device locations z=($x_1$, $y_1$, $x_2$, $y_2$, . . . , $x_N$, $y_N$) may be reconstructed by formulating an optimization problem that minimizes the cumulative observation errors subject to feasibility constraints derived from geometries among mobile devices.

Figure 11:
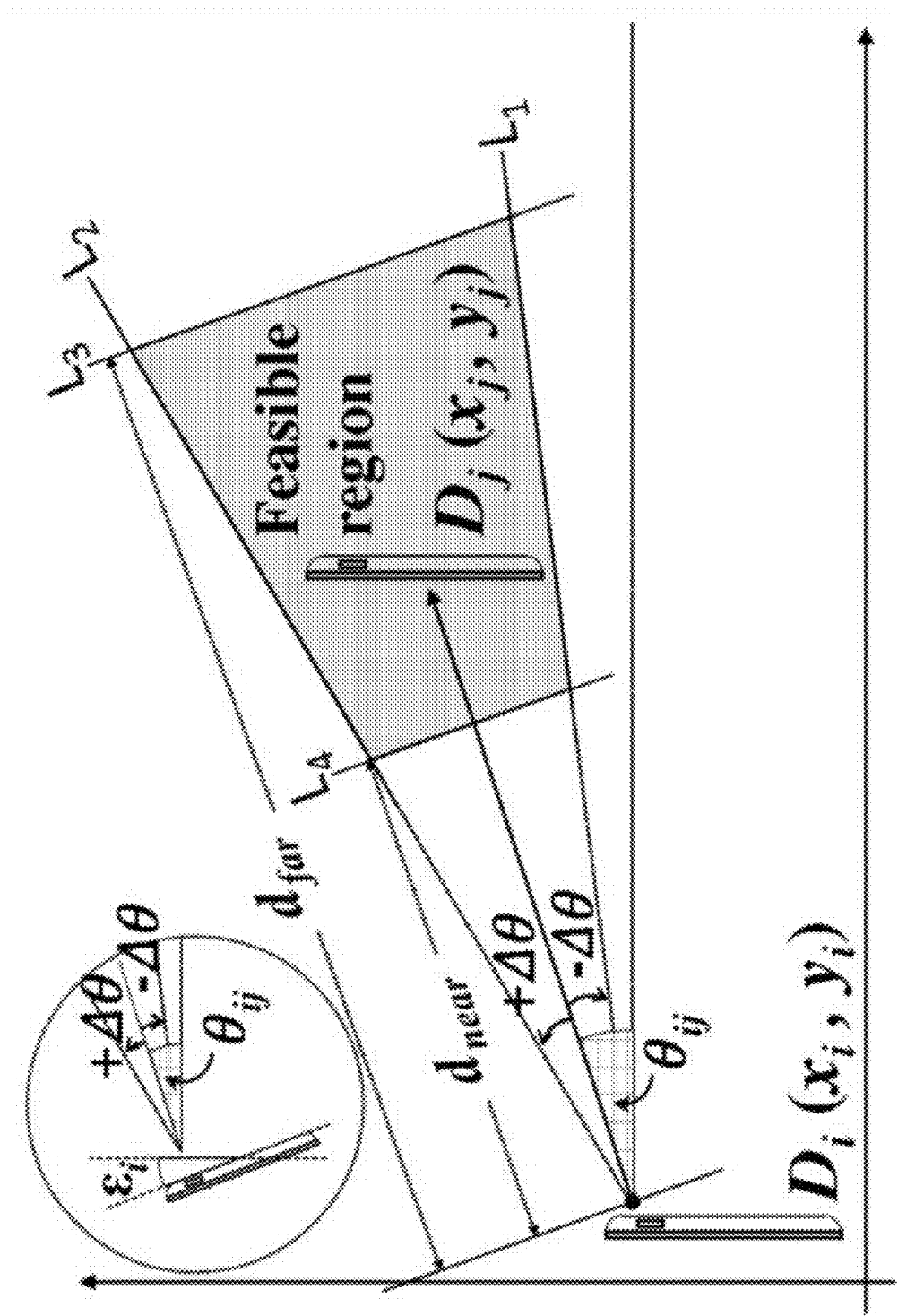
FIG. 11 illustrates an exemplary Cartesian plane to solve constrained optimization, in accordance with one embodiment.

Consider FIG. 11, which provides an exemplary Cartesian plane to solve constrained optimization. To define a region in which $D_j$ may exist in relative terms of $D_i$'s location, a trapezoidal area may be created that is enclosed by four lines $L_1$, $L_2$, $L_3$, and $L_4$. To consider a possible imprecise measurement of $\theta_{ij}$, $L_1$ and $L_2$ may have slopes that are apart from $\theta_{ij}$ by $-\Delta\theta$ and $+\Delta\theta$, respectively. In one embodiment, there may be a maximum distance that $D_i$'s camera can identify $D_j$'s code. Also, $D_i$ and $D_j$ may be distant by at least a one-person width. These two distance constraints may define $L_3$ and $L_4$ which may be orthogonal to the line $\overline{D_iD_j}$ and may be distant from $D_i$ by $d_{far}$ and $d_{near}$ respectively. From the equations of $L_1$, $L_2$, $L_3$, and $L_4$, linear inequalities may be derived defining the feasible region in which ($x_j$, $y_j$) would exist.

Table 3 illustrates an exemplary feasible region derivation. Of course, it should be noted that the derivation shown in Table 3 is set forth for illustrative purposes only, and thus should not be construed as limiting in any manner.

TABLE 3

$$L_1 \to y_j \geq \tan(\theta_{ij} - \Delta\theta)(x - x_i) + y_i$$

$$L_2 \to y_j \leq \tan(\theta_{ij} + \Delta\theta)(x - x_i) + y_i$$

$$L_3 \to x_j \leq \frac{1}{\tan\left(\theta_{ij} + \frac{\pi}{2}\right)}\{y_j - (y_i + d_{fy})\} + (x_i + d_{fx})$$

$$L_4 \to x_j \geq \frac{1}{\tan\left(\theta_{ij} + \frac{\pi}{2}\right)}\{y_j - (y_i + d_{ny})\} + (x_i + d_{nx})$$

where $d_{fx} = d_{far}\cos\theta_{ij}$, $d_{fy} = d_{far}\sin\theta_{ij}$, $d_{nx} = d_{near}\cos\theta_{ij}$, $d_{ny} = d_{near}\sin\theta_{ij}$ Note that alternative forms may be used for the derivation that places $x_j$ on the left-hand side and may take a reciprocal of the original slope. It is to have a zero slope instead of infinity at $\theta_{ij}$=0.

Next, a cost function to be minimized may be defined. Consider N mobile devices and the unidirectional observations among a part of them. Let O denote a set of ordered pairs where a pair (i,j) is an element if and only if an observation from $D_i$ to $D_j$ exists. The objective is to find a vector z=($x_1$, $y_1$, $x_2$, $y_2$, . . . , $x_N$, $y_N$) minimizing the error between $\theta_{ij}$ and the computed slope angle of $\overline{D_iD_j}$ subject to the derivation in Table 3.

Table 4 illustrates the cost function $f$ and its gradient. Of course, it should be noted that the cost function $f$ shown in Table 4 is set forth for illustrative purposes only, and thus should not be construed as limiting in any manner.

TABLE 4

$$f(x_1, y_1, \ldots, x_N, y_N) = \sum_{(i,j) \in O} \{\arctan 2(y_j - y_i, x_j - x_i) - \theta_{ij}\}^2$$

$$\nabla f = \sum_{i=1}^{N} \left(\frac{\partial f}{\partial x_i}\hat{x}_i + \frac{\partial f}{\partial y_i}\hat{y}_i\right)$$

To make $f$ differentiable, the angular difference may be squared instead of taking its absolute value. Note that arctan 2(y, x) is differentiable by x and y except where $\overline{x^2+y^2}$+x=0. This singularity is not in the domain because $D_i$ and $D_j$ do not overlap, observations are unidirectional, and the Cartesian plane is defined to always place $D_i$ to the left side of $D_j$.

In addition, at least one device may be fixed on the Cartesian plane to keep the problem's domain bounded. Without loss of generality, a constraint may be added to anchor an arbitrary device at the origin: $x_1$=0, $y_1$=0.

Further, in one embodiment, additional constraints may be considered in special cases where the crowd formation is partly or wholly rectangular. In a rectangular formation, the people in the first row may know they are in the first row, as no one else is in front of them. The mobile application 502 may be extended to provide a simple interface so that one can self-declare that they are in the first row. In our coordinate system as in Table 4, this self-declaration may be interpreted into the following constraint: for a device $D_k$ that self-declares being in the front row, $x_k \leq \forall x \in \{x_i | 1 \leq i \leq N\}$.

In another embodiment, similar constraints may be constructed for those who self-declare that they are in the last row, left, or right-most column, etc.

Now the optimization problem may be translated into a nonlinear programming problem to find z=($x_1$, $y_1$, $x_2$, $y_2$, . . . , $x_N$, $y_N$) minimizing f in Table 4 subject to linear inequality constraints in Table 3, optionally front, back, or side row constraints, and the linear equality anchor constraint. This family of problems may be effectively solved by a number of different algorithms.

Upon the return of the reconstructed locations from the back end optimizer 530, the front end coordinator 524 may plan how to visualize a given image over the crowd. First, the image to be drawn may be resampled to fit the number of mobile devices in both horizontal and vertical directions. Next, the reconstructed locations of the mobile devices may be quantized to snap to virtual uniform grids. To determine the proper distance of a unit grid spacing, the front end coordinator 524 may collect the distances to 4-way nearest neighbors from each mobile device, i.e., the nearest neighbor in each of four quadrants centered at the mobile device: (−45°, 45°], (45°, 135°], (135°, 225°], and (225°, 315°]. A unit grid spacing may be set as the median distance of all the 4-way nearest neighbors from each mobile device. Last, each pixel of the resampled image may be assigned to the mobile device whose quantized locations are at the corresponding grid.

In one embodiment, a camera of a mobile device may be displaced from a center of the device. To address this, the observer's Y-axis coordinates $y_i$ may be replaced with $y_i+\delta_i$ in Table 3 and Table 4, where $\delta_i$ denotes a displacement constant defined by the mobile device's form factor. A table may be implemented to look up $\delta_i$ per mobile device model at runtime. Note that the target's coordinates $(x_j, y_j)$ may remain the same in the equations because the observer sees the center of the target's display.

Additionally, in one embodiment, gyroscope drift and magnetometer interferences may affect the compass sensing, and may therefore affect the horizontal heading $\alpha_x$. In order to address these discrepancies in local measurement of the devices' horizontal headings, a variable $\varepsilon_i$ may be introduced that represents an observer-specific error on its horizontal heading. For a given observer, it may be assumed that $\varepsilon_i$ would be considered as a static offset for a short period of time. Thus $\varepsilon_i$ may be modeled to be an observer-dependent variable, rather than an observation-dependent variable. The cost function $f$ may be revised to have an ability to manipulate $\varepsilon_i$ within a small interval.

Table 5 illustrates a revised cost function $f$. Of course, it should be noted that the revised cost function $f$ shown in Table 5 is set forth for illustrative purposes only, and thus should not be construed as limiting in any manner.

Figure 12:
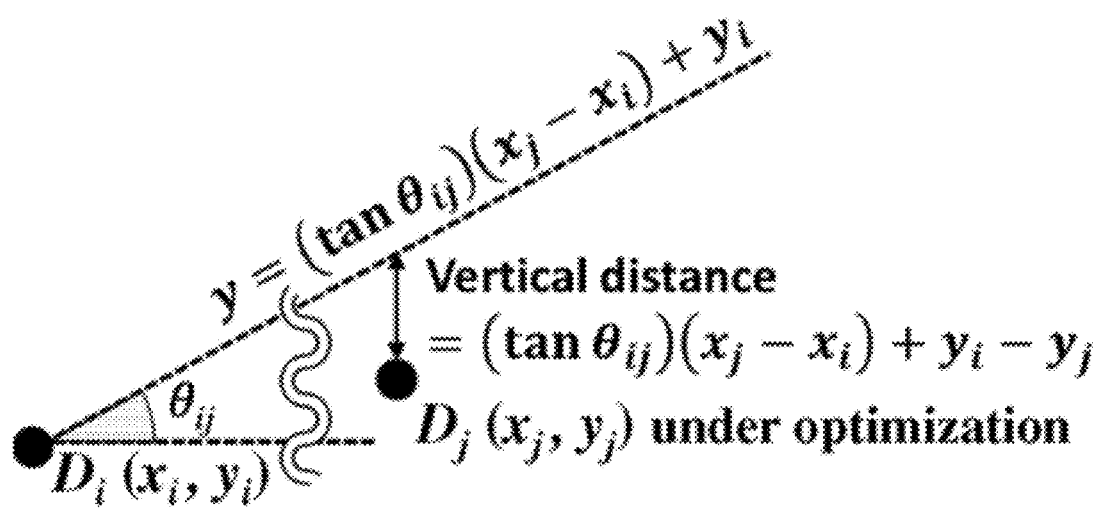
FIG. 12 illustrates an exemplary geometry for an alternative cost function, in accordance with one embodiment.

TABLE 5

$$f(x_1, y_1, \ldots, x_N, y_N, \varepsilon_1, \ldots, \varepsilon_N) = \sum_{(i,j) \in O} \left\{ \frac{\arctan 2\{y_j - (y_i + \delta_i),}{x_j - x_i\} - (\theta_{ij} + \varepsilon_i)} \right\}^2$$

$$\nabla f = \sum_{i=1}^{N} \left( \frac{\partial f}{\partial x_i} \hat{x}_i + \frac{\partial f}{\partial y_i} \hat{y}_i + \frac{\partial \varepsilon}{\partial \varepsilon_i} \hat{\varepsilon}_i \right)$$

where $-\Delta \varepsilon \le \varepsilon_i \le +\Delta \varepsilon$, for $1 \le i \le N$ Further, in one embodiment, a higher similarity between the initial values and the ground truth locations may yield faster and more accurate reconstruction of the relative locations. To obtain initial values at less complexity, a linearly constrained quadratic polynomial programming problem may be formulated. An alternative cost function may be implemented, which is the vertical distance between $(x_j, y_j)$ and the line passing $(x_i, y_i)$ at a slope of $\tan \theta_{ij}$. Consider FIG. 12, which provides an exemplary geometry for the alternative cost function.

Table 6 illustrates an accelerated cost function $f_a$. Of course, it should be noted that the accelerated cost function $f_a$ shown in Table 6 is set forth for illustrative purposes only, and thus should not be construed as limiting in any manner.

TABLE 6

$$f_a(x_1, y_1, \ldots, x_N, y_N) = \sum_{(i,j) \in O} [\{(x_j - x_i) \tan \theta_{ij} + y_i\} - y_j]^2$$

A quadratic programming algorithm may be used to find z minimizing $f_a$ subject to the same linear constraints hereinabove. $\theta_{ij}$ may be a constant given from the observation.

Additionally, in one embodiment, for a large crowd implementation, CaaS may be able to leverage the global positioning system (GPS) built in the mobile devices. If a crowd's spatial dimension is greater than an error range of the GPS, the CaaS back end optimizer 530 may introduce extra linear inequality constraints about the devices' locations. Specifically, each device's (x,y) coordinate may be bounded by the device's locally measured GPS coordinate plus and minus a GPS error distance.

Further, in one embodiment, when people sit on a seat or stand in a stadium, their phones may be unable to see the screen of phones behind. One exemplary solution is to guide people to hold their phones tilted at the angle of slope of the seats. To guide the right angle, the CaaS mobile application 502 may provide a tactile feedback when the phone is tilted at a proper angle.

Further still, in one embodiment, the above methodology may be implemented utilizing a divide and conquer strategy. For example, a breadth-first search from a device over a limited depth may isolate a subgroup of spatially adjacent devices. In this way, the entire group of mobile devices may be divided into subgroups of adjacent devices, and the localization may be completed in a linear time, or sub-linear by parallelism.

Also, in one embodiment, a solution to partial location changes of one or more of a plurality of devices during implementation may be to initiate spatially-isolated relative localization only for a subgroup of devices within the vicinity of a newly moved-in user. A move-out may be paired with a move-in elsewhere, or may be identified upon closing the CaaS mobile app. To enable a newly moved-in device to detect nearby devices, each CaaS mobile app may sporadically toggle its Bluetooth discoverability. In another embodiment, a device identifier may be disseminated by watermarking it on the tiles of the device displays; a newly moved-in device may report a nearby seen identifier.

Additionally, each instance of the mobile application 502 may be responsible for encoding its own identifier, performing local observations, interacting with the cloud-side service 504, and displaying the timed sequence of tiles assigned on it. Second, the cloud-side service 504 includes two parts: (1) the front end coordinator 524 which may be responsible for interacting with the mobile application 502, collecting their local observations, generating and dispatching the timed tile sequences to each mobile application, and (2) the back end optimizer 530 which may construct a constrained optimization problem based on the local observations and may execute a solver instance based on nonlinear programming techniques. As a result, individual users may be accurately localized in a densely packed crowd, utilizing a collective localization technique based on mobile-side pair-wise visual observations and cloud-side constrained optimization.

Further, to ensure accurate and scalable relative localizations, a collective localization technique is utilized based on mobile-side pair-wise visual observations and cloud-side constrained optimization. For the mobile-side observations, a vision-based device identification technique may encode a unique identifier into a color-transition sequence on the device's display. All-user relative locations may then be reconstructed using distributed observations among mobile devices. A constrained optimization problem may then be applied to on the observations set, which may complete localizations to achieve collective visualizations.

In this way, Card-stunt as a Service (CaaS), a service enabling a co-located crowd to instantly visualize symbols collectively over the crowd using their mobile devices and cloud services, may be implemented. To address the relative localization challenges under the scenarios in indoor or outdoor public squares or stadiums where stationary localization infrastructure is unlikely, an architecture may be provided with mobile vision sensing and cloud-side constrained nonlinear optimization. The implementation may be robust and effective, and may extend to consider topology changes of the crowds or provide scalability. CaaS may create various new collective expressiveness for groups of people.

Figure 6:
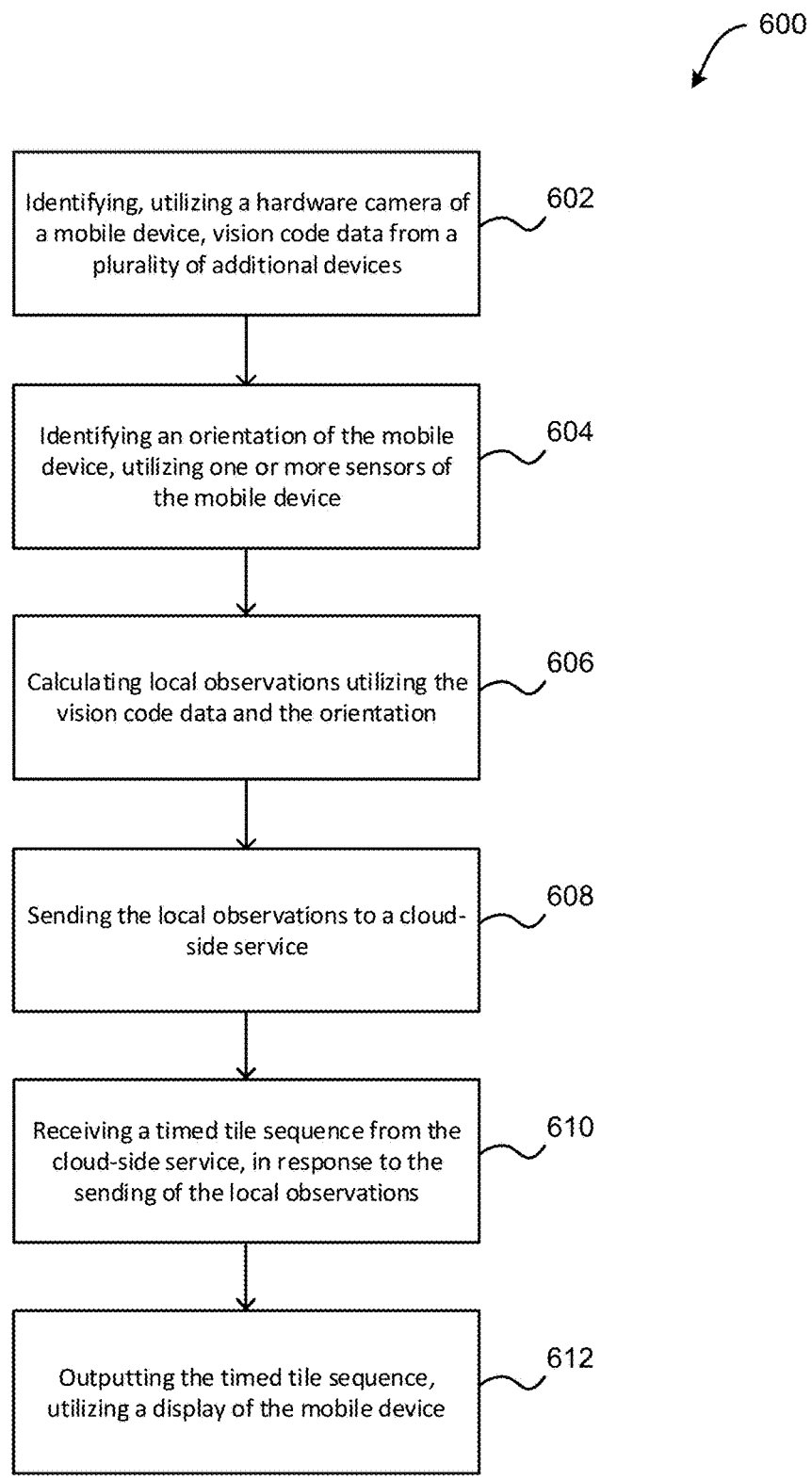
FIG. 6 illustrates a method for implementing a card stunt as a service (CaaS) mobile application of a mobile device, in accordance with one embodiment.

Now referring to FIG. 6, a flowchart of a method 600 for implementing a card stunt as a service (CaaS) mobile application of a mobile device is shown according to one embodiment. The method 600 may be performed in accordance with the present invention in any of the environments depicted in FIGS. 1-5 and 7, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where vision code data is identified from a plurality of additional devices, utilizing a hardware camera of a mobile device. In one embodiment, the vision code data may be identified by a CaaS mobile application that may identify the vision code data from the other devices while outputting vision code data itself utilizing a display of the mobile device.

In another embodiment, each of the plurality of additional devices may be in a possession of a unique individual located within a single crowd of people. In yet another embodiment, the vision code data may include a plurality of temporally coded single colored frames. For example, the vision code data from the plurality of additional devices may include a unique identifier for each of the plurality of additional devices.

Additionally, method 600 may proceed with operation 604, where an orientation of the mobile device is identified, utilizing one or more sensors of the mobile device. In one embodiment, the one or more sensors of the mobile device may include one or more of a magnetometer of the mobile device, a gravity sensor of the mobile device, an accelerometer of the mobile device, etc.

Further, method 600 may proceed with operation 606, where local observations are calculated utilizing the vision code data and the orientation. In one embodiment, the local observations may include a relative angle between the mobile device and an observed device within a field of view of the hardware camera of the mobile device. In another embodiment, the local observations may include a relative orientation of the mobile device when compared to the plurality of additional devices.

Further still, method 600 may proceed with operation 608, where the local observations are sent to a cloud-side service. In one embodiment, the local observations may be sent to the cloud-side service utilizing a communications network (e.g., a wireless network, a cellular network, etc.).

Also, method 600 may proceed with operation 610, where a timed tile sequence is received from the cloud-side service, in response to the sending of the local observations. In one embodiment, the timed tile sequence may be one of a plurality of timed tile sequences sent to the mobile device and the plurality of additional devices. For example, the plurality of timed tile sequences may create a composite image when displayed by the mobile device and the plurality of additional devices.

In addition, method 600 may proceed with operation 612, where the timed tile sequence is output, utilizing a display of the mobile device.

In this way, the CaaS mobile application may perform visual observations of the environment surrounding the mobile device, submit such observations to the cloud-side CaaS service, and display timed tiles on the mobile device in order to effect a card stunt implementation in conjunction with a plurality of other mobile devices.

Figure 7:
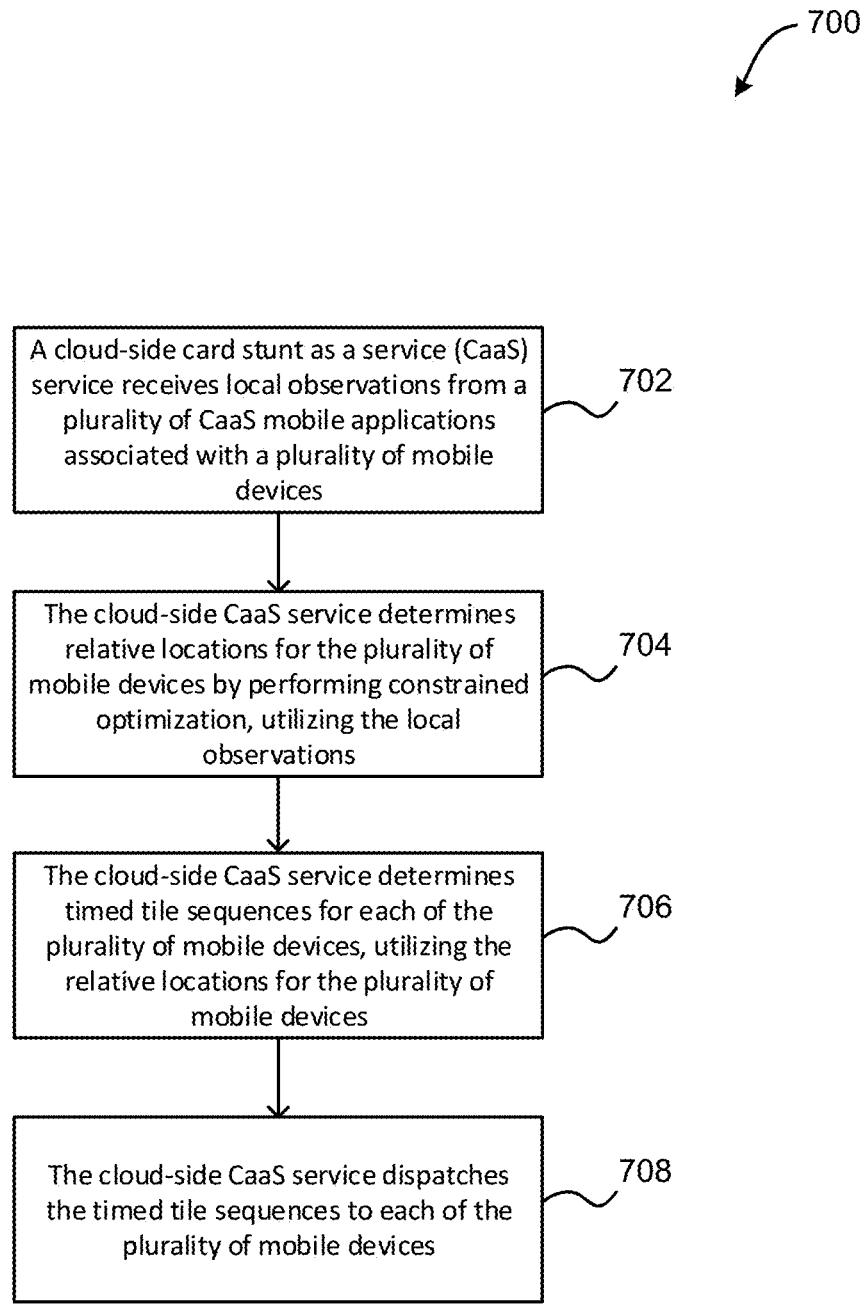
FIG. 7 illustrates a method for implementing a card stunt as a cloud-side (CaaS) service, in accordance with one embodiment.

Now referring to FIG. 7, a flowchart of a method 700 for implementing a card stunt as a cloud-side (CaaS) service is shown according to one embodiment. The method 700 may be performed in accordance with the present invention in any of the environments depicted in FIGS. 1-6, among others, in various embodiments. Of course, more or less operations than those specifically described in FIG. 6 may be included in method 600, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a cloud-side card stunt as a service (CaaS) service receives local observations from a plurality of CaaS mobile applications associated with a plurality of mobile devices. In one embodiment, the local observations may be received at a front end coordinator portion of the cloud-side CaaS service.

Additionally, method 700 may proceed with operation 704, where the cloud-side CaaS service determines relative locations for the plurality of mobile devices by performing constrained optimization, utilizing the local observations. In one embodiment, the constrained optimization may be performed at a back end optimizer of the cloud-side CaaS service.

Further, method 700 may proceed with operation 706, where the cloud-side CaaS service determines timed tile sequences for each of the plurality of mobile devices, utilizing the relative locations for the plurality of mobile devices. In one embodiment, the back end optimizer may provide the front end coordinator with the relative locations, and the front end coordinator may then determine the timed tile sequences.

Further still, method 700 may proceed with operation 708, where the cloud-side CaaS service dispatches the timed tile sequences to each of the plurality of mobile devices.

In this way, the cloud-side CaaS service may utilize observation data from each of the plurality of mobile devices to determine a location of each of the plurality of mobile devices relative to each other, and send timed tiles to each of the plurality of mobile devices based on their locations in order to effect a card stunt implementation.

Figure 8:
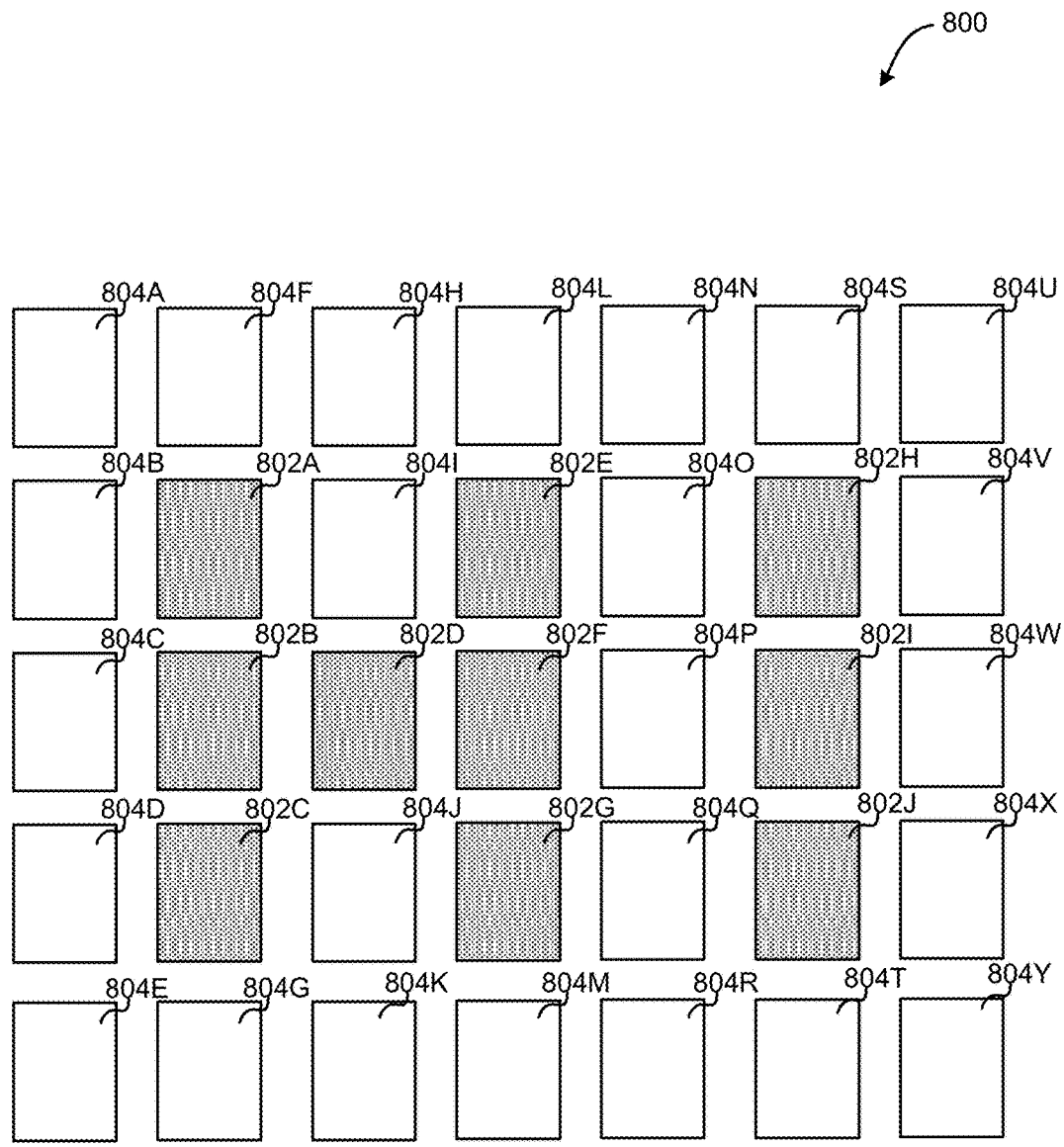
FIG. 8 illustrates an exemplary card stunt as a service (CaaS) visualization, in accordance with one embodiment.

Now referring to FIG. 8, an exemplary card stunt as a service (CaaS) visualization 800 is shown according to one embodiment. As shown, the CaaS visualization 800 is implemented utilizing a first plurality of displays 802A-J of mobile devices in addition to a second plurality of displays 804A-Y of mobile devices. In one embodiment, each of the first plurality of displays 802A-J and the second plurality of displays 804A-Y includes a display portion of a mobile device (e.g., a screen of the device, etc.). For example, each of the first plurality of displays 802A-J and the second plurality of displays 804A-Y may be held above a head of an individual user (e.g., a user within a group of users).

Additionally, in one embodiment, each of the first plurality of displays 802A-J display a first color (e.g., a first colored tile), and each of the second plurality of displays 804A-Y display a second color (e.g., a second colored tile) different from the first color. In another embodiment, for each of the first plurality of displays 802A-J and the second plurality of displays 804A-Y, the color presented by the display may be indicated as part of a timed tile sequence received by the corresponding mobile device, where the timed tile sequence received by each mobile device is based on a determined relative location of the mobile device within the plurality of mobile devices.

In this way, an observer separate from the group of users that observes the first plurality of displays 802A-J and the second plurality of displays 804A-Y from a distance may view a composite image (in this example, the word "HI") resulting from the different colored tiles The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
providing feedback by a mobile device to guide a placement of the mobile device to a predetermined orientation;
identifying, utilizing a hardware camera of the mobile device, vision code data from a plurality of additional devices that are within a field of view of the hardware camera of the mobile device at an actual orientation;
identifying the actual orientation of the mobile device, utilizing one or more sensors of the mobile device;
calculating local observations at the mobile device utilizing the vision code data and the actual orientation;
sending the local observations from the mobile device to a cloud-side service;
receiving a timed tile sequence at the mobile device from the cloud-side service, in response to the sending of the local observations by the mobile device; and
outputting the timed tile sequence at the mobile device, utilizing a display of the mobile device.

2. The computer-implemented method of claim 1, wherein:
for each of the plurality of additional devices, the vision code data includes a plurality of temporally coded single colored frames identifying the additional device,
the local observations include, for each of the plurality of additional devices, a relative angle between the mobile device and the additional device, and a relative orientation of the mobile device compared to the plurality of additional devices, and
the timed tile sequence is one of a plurality of timed tile sequences that create a composite image when displayed by the mobile device and the plurality of additional devices.

3. The computer-implemented method of claim 1, wherein the one or more sensors of the mobile device are selected from a group consisting of a magnetometer of the mobile device, a gravity sensor of the mobile device, and an accelerometer of the mobile device.

4. The computer-implemented method of claim 1, wherein for each of the plurality of additional devices, the vision code data includes a plurality of temporally coded single colored frames identifying the additional device.

5. The computer-implemented method of claim 1, further comprising, during the calculating of the local observations:
compensating for a displacement of the hardware camera from a center of the mobile device; and
compensating for a discrepancy in a local measurement of a horizontal heading of the mobile device caused by one or more components of the mobile device.

6. The computer-implemented method of claim 1, further comprising sporadically toggling a wireless discoverability of the mobile device, in order to enable a detection of a new device within the plurality of additional devices.

7. The computer-implemented method of claim 1, wherein the local observations are sent to the cloud-side service utilizing a communications network.

8. The computer-implemented method of claim 1, further comprising:
displaying vision code data for the mobile device; and
adjusting a number of distinct colors included within the vision code data for the mobile device, based on external lighting conditions.

9. The computer-implemented method of claim 1, further comprising normalizing the actual orientation of the mobile device.

10. The computer-implemented method of claim 1, wherein the timed tile sequence is one of a plurality of timed tile sequences sent to the mobile device and the plurality of additional devices, and the plurality of timed tile sequences create a composite image when displayed by the mobile device and the plurality of additional devices.

\* \* \* \* \*